H. G. MAULE.
SAFETY FIRE STOP VALVE.
APPLICATION FILED MAY 10, 1920.

1,373,902.

Patented Apr. 5, 1921.

INVENTOR.

H. G. Maule.

BY

Fred P. Sorin

ATTORNEY.

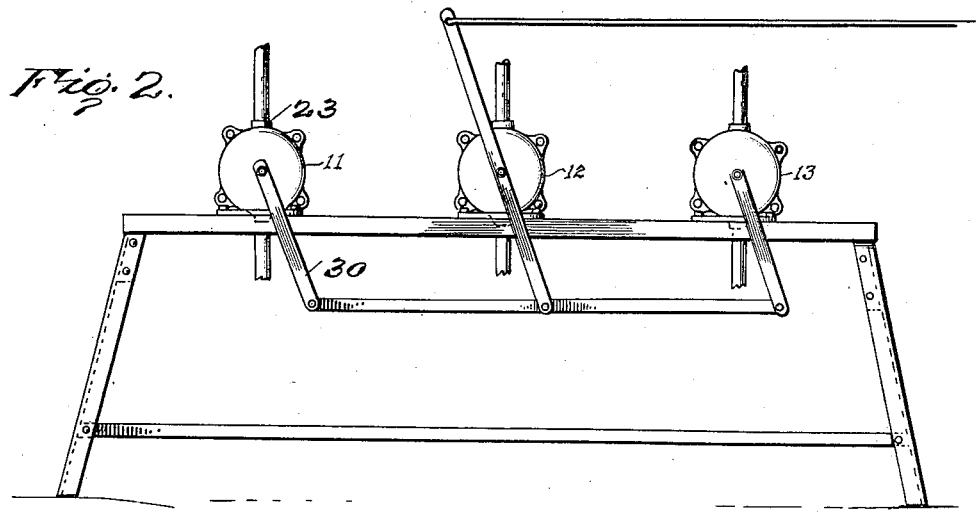
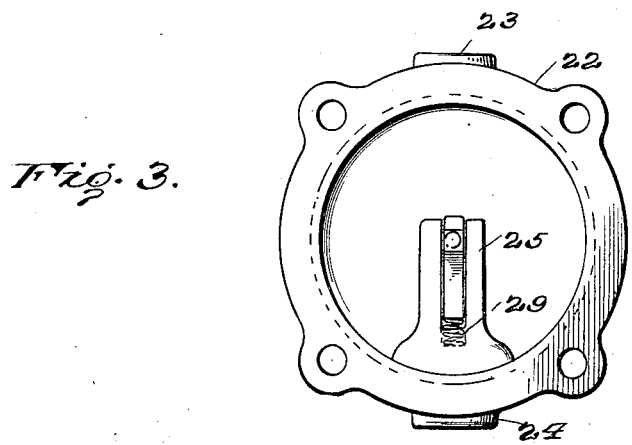
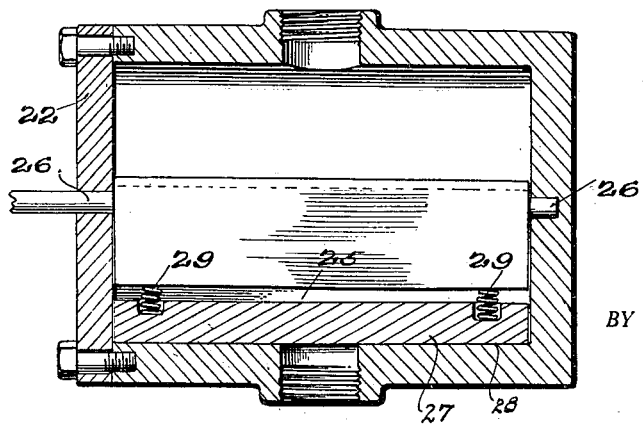

UNITED STATES PATENT OFFICE.

HARVEY GRANGER MAULE, OF SEATTLE, WASHINGTON, ASSIGNOR OF ONE-HALF TO REGINALD A. PEARCE, OF KING COUNTY, WASHINGTON.

SAFETY FIRE-STOP VALVE.

1,373,902.   Specification of Letters Patent.   Patented Apr. 5, 1921.

Application filed May 10, 1920. Serial No. 380,325.

*To all whom it may concern:*

Be it known that I, HARVEY G. MAULE, a citizen of the United States, and residing at Seattle, in the county of King and State of Washington, have invented certain new and useful Improvements in Safety Fire - Stop Valves, of which the following is a specification.

This invention relates generally to an improvement in fluid fuel pressure systems, wherein the fluid fuel is fed under pressure from a supply tank to the point of ignition. The invention is more particularly directed to valve control mechanisms for such system, wherein in the event of breakage of any of the fuel pipes of the system, such control may be instantly had as to prevent leakage of the fuel and consequent danger from fire.

In such systems, particularly the fuel feeding system on oil burning ships, there is liability of the pipe bursting under excessive pressure, and the consequent spraying or leakage of the oil on surrounding objects and a resultant tendency to fire. With the use of my valve control means, applied in such a system, anyone having a knowledge of a leakage can instantly control the system to direct the oil into a tank provided for the purpose, and under suction to compel the flow of the oil toward said tank, and thereby minimize the leakage and loss of oil.

In the drawings:—

Fig. 2 is an enlarged elevation of the valve control mechanism.

Fig. 3 is a transverse section through one of the valves.

Fig. 4 is a longitudinal section through one of the valves.

Figure 1:
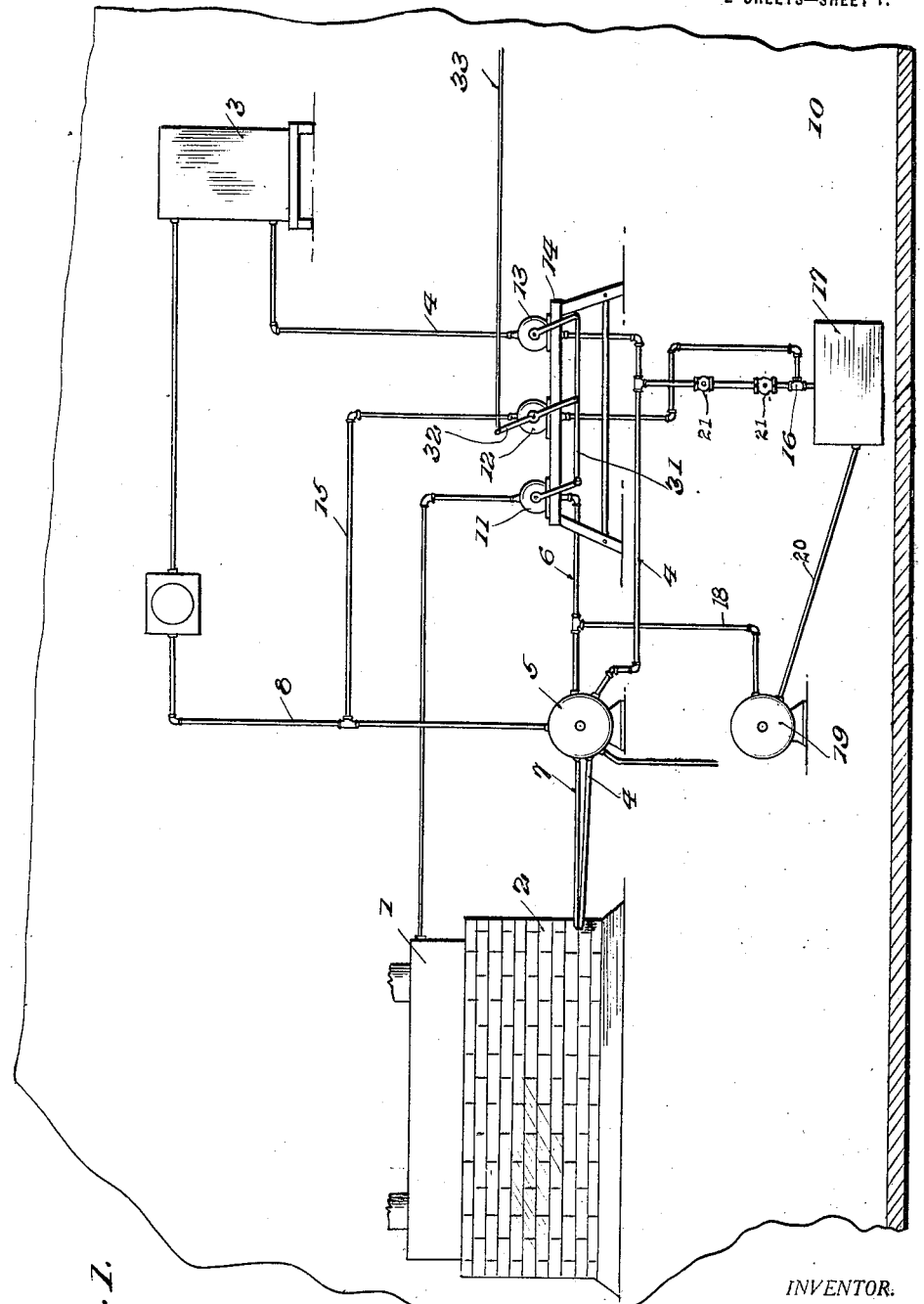
Figure 1 is a view indicating more or less diagrammatically a system of supply for oil burning furnaces, and showing my improved valve control mechanism applied thereto.

The system herein shown, which is intended to conventionally illustrate the oil feeding system for a furnace, as used aboard oil burning ships, comprises a furnace 1 heated through oil burners arranged in a casing 2, below the furnace, the fuel being supplied from an oil tank 3 through a pipe 4. The pipe 4 leads to and through a pressure pump 5 operated by steam through a pipe 6 leading from the boiler 1. Exhaust steam from the pump 5 is led through a pipe 7 to the burners within the casing 1, joining the oil supply pipe 4, adjacent its delivery end, to add to the pressure of the supply and also to atomize the oil. A safety pipe 8 leads from the pump 5 to the tank 3 having therein the usual snifter valve 9 arranged to relieve the system at any predetermined pressure.

The system as so far described is conventionally illustrative of an oil supply system for furnaces, the various parts described being suitably arranged, for example in a vessel 10. My improved control mechanism includes three valves 11, 12 and 13, each of similar construction, to be later specifically described, said valves being supported in spaced relation upon a suitable base 14.

The oil feed pipe 4 from the tank is led through the valve 13 and from the valve to the pump 5; while the steam supply pipe 6 is led from the furnace through the valve 11 and thence to the pump 5. A by-pass 15 communicates with the pipe 8 between the pump and snifter valve 9, such pipe 15 leading through the valve 12 and thence to a pipe 16 which communicates with a tank 17 adapted to be held under a vacuum or suction. A pipe 18 leads from the steam supply 6 between the valve 11 and the pump 5, said pipe 18 leading to an auxiliary pump 19 which is in turn a communication through a pipe 20 with the suction tank 17. The pipe 16 leads beyond its connection with the pipe 15 to and is in communication with the oil feed pipe 4, said pipe 16 being provided with check valves 21 which open under pressure toward the feed pipe 4.

The respective valves 11, 12 and 13 are of identical construction, each comprising a casing 22 having an inlet 23 and a diametrically opposed outlet 24. A valve body 25 is rotatably mounted on trunnions 26 in the casing 22, and slidably supports a valve proper 27 having a bearing face 28 adapted to coöperate with the outlet 24 to close the same. The valve slidably embraces the body 25 and is held in contact with the surface of the casing by springs 29. The valves 11, 12 and 13 are arranged in line and one trunnion 26 of each is extended beyond the casing and terminally formed to permit the application thereto of a fixed link 30. The lower ends of the links are connected by a tie bar 31, so that all valves may be operated in unison, and one of the links, as for example that coöperating with valve 12 is extended above the valve as a hand bar 32 from which extends a cable 33 which may be led to those portions of the ship from which it is desired to control the system.

With the system in operation valves 11 and 13 are opened and valve 12 closed. The pumps can now operate to deliver oil to the burners and to maintain the suction in tank 17. In the event of breakage in the system, as for example the bursting of the oil pipe under excessive pressure, such as may occur if the snifter valve fails to operate, any attendant upon the knowledge of such leakage will operate the valves through the cable 33, closing valves 11 and 13 and opening valve 12. The oil pipes of the system are thus opened to the suction tank 17, and the oil instead of being scattered over the surrounding surfaces will be drawn into said tank. Liability of fire is thus avoided, and the oil otherwise lost will be stored in such tank 17 for further use.

Claims:

1. In an oil burning system, an oil supply tank, a pump for delivering oil therefrom under pressure to a burner, a motive fluid for the pump, a suction tank, a communication between said suction tank and the oil system, a normally open valve for the oil from the supply tank, a normally open valve for the motive fluid for the pump, and a normally closed valve controlling communication with the suction tank.

2. In an oil burning system, an oil supply tank, a pump for delivering oil therefrom under pressure to a burner, a motive fluid for the pump, a suction tank, a communication between said suction tank and the oil system, a normally open valve for the oil from the supply tank, a normally open valve for the motive fluid for the pump and a normally closed valve controlling communication with the suction tank, and means for simultaneously operating all of said valves to reverse their positions.

3. In an oil burning system, an oil supply tank, a pump for delivering oil therefrom under pressure to a burner, a feed connection for conveying oil from the tank to the pump, a return connection from the pump to the tank for excess oil from said pump, a motive fluid for the pump, a suction tank, a connection between the suction tank and the feed connection, a connection with the suction tank and the return connection, a normally open valve for controlling the feed connection, a normally open valve for the motive fluid, and a normally closed valve controlling communication with the suction tank.

4. In an oil supply system, an oil supply tank, a pump for delivering oil under pressure to a burner, a feed pipe connecting the supply tank and pump, a return pipe from the pump to the tank for excess oil from the pump, a motive fluid for the pump, a suction tank, a connection between the suction tank and oil feed pipe, a connection between the return pipe and suction tank, check valves for establishing one way communication in the connection between the suction tank and oil feed pipe, a normally open valve for controlling the oil in the feed pipe, a normally open valve for the motive fluid, a normally closed valve controlling communication with the suction tank, and means for simultaneously operating all of said valves to reverse their positions.

In testimony whereof I affix my signature.

HARVEY GRANGER MAULE.